United States Patent
Schöffel et al.

(10) Patent No.: US 11,739,198 B2
(45) Date of Patent: Aug. 29, 2023

(54) SULFUR-CROSSLINKABLE RUBBER MIXTURE VULCANIZATE AND VEHICLE TYRE

(71) Applicant: Continental Reifen Deutschland GmbH, Hannover (DE)

(72) Inventors: Julia Schöffel, Hannover (DE); Norbert Müller, Nienhagen (DE); Carla Recker, Hannover (DE); Kirsten Schwekendiek, Wunstorf (DE)

(73) Assignee: Continental Reifen Deutschland GmbH, Hannover (DE)

( * ) Notice: Subject to any disclaimer, the term of this patent is extended or adjusted under 35 U.S.C. 154(b) by 304 days.

(21) Appl. No.: 17/258,760

(22) PCT Filed: Jun. 11, 2019

(86) PCT No.: PCT/EP2019/065128
§ 371 (c)(1),
(2) Date: Jan. 8, 2021

(87) PCT Pub. No.: WO2020/011463
PCT Pub. Date: Jan. 16, 2020

(65) Prior Publication Data
US 2021/0324183 A1     Oct. 21, 2021

(30) Foreign Application Priority Data
Jul. 13, 2018   (EP) ..................... 18183305

(51) Int. Cl.
*C08L 9/06* (2006.01)
*B60C 1/00* (2006.01)

(52) U.S. Cl.
CPC .............. *C08L 9/06* (2013.01); *B60C 1/0016* (2013.01)

(58) Field of Classification Search
CPC ..................... C08L 9/06; B60C 1/00
USPC ...................................... 524/188
See application file for complete search history.

(56) References Cited

U.S. PATENT DOCUMENTS

2003/0191270 A1   10/2003   Musa
2013/0172481 A1   7/2013    Okada et al.
2015/0329571 A1   11/2015   Moser et al.
2015/0329572 A1   11/2015   Moser et al.
2015/0329573 A1   11/2015   Moser et al.
2017/0073508 A1*  3/2017    Schwekendiek .......... C08L 9/06
2019/0241721 A1   8/2019    Schmaunz-Hirsch et al.

FOREIGN PATENT DOCUMENTS

| CN | 1834100 A    | 9/2006  |
| CN | 1931862 A    | 3/2007  |
| CN | 1970565 A    | 5/2007  |
| CN | 102958991 A  | 3/2013  |
| EP | 2944640 A1   | 11/2015 |
| EP | 2947087 A1   | 11/2015 |
| EP | 3260304 A1   | 12/2017 |
| JP | 2001040143 A | 2/2001  |
| JP | 2002201312 A | 7/2002  |
| WO | 2015172915 A1| 11/2015 |

OTHER PUBLICATIONS

International Search Report of application PCT/EP2019/065128 on which this application is based on.
First Search dated Jul. 7, 2022 from corresponding Chinese patent application No. 201980046686.9.
First Office Action dated Jul. 13, 2022 from corresponding Chinese patent application No. 201980046686.9.
First Office Action dated Jul. 13, 2022 from corresponding Chinese patent application No. 201980046686.9 (Translated).

* cited by examiner

*Primary Examiner* — Deve V Hall
(74) *Attorney, Agent, or Firm* — David L. Cate; Gregory Adams

(57) ABSTRACT

The invention relates to a sulfur-crosslinkable rubber mixture, a vulcanizate and a vehicle tire.
The sulfur-crosslinkable rubber mixture contains at least the following constituents:
at least one diene rubber and
at least one silica and
at least one silane having the general empirical formula $$[(R^1)_o Si-(R^3-)_p X-(R^4-)_p]_m S_n (R^2)_{2-m}, \qquad I)$$

where X is a radical comprising at least one polar group selected from urethane, amide, ester, amine, thiourea, thioamide,
O-organyl thiocarbamate, S-organyl thiocarbamate, amidine, guanidine,
piperidine, maleic anhydride, sulfonamide, carbonate, imidazoline, thiazolidine, thiazolidinone, pyrrolidine, pyrazole, benzimidazole, indole, purine, thiazine, sulfonate, and phosphonate groups.

20 Claims, No Drawings

SULFUR-CROSSLINKABLE RUBBER MIXTURE VULCANIZATE AND VEHICLE TYRE

The invention relates to a sulfur-crosslinkable rubber mixture, a vulcanizate and a vehicle tire.

WO 2015/172915 A1 discloses a rubber mixture comprising silane coupling agents having a polar urea-containing spacer group between silyl and sulfur group.

It is an object of the present invention, proceeding from the prior art, to provide a sulfur-crosslinkable rubber mixture that has an improvement in the trade-off between rolling resistance and wet grip, with the other properties, such as hardness and stiffness in particular, remaining at least at a comparable same level or even likewise being improved.

The object is achieved in accordance with the invention in that the sulfur-crosslinkable rubber mixture comprises at least the following constituents:
at least one diene rubber and
at least one silica and
at least one silane having the general empirical formula

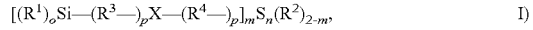

$$[(R^1)_o Si-(R^3-)_p X-(R^4-)_p]_m S_n(R^2)_{2-m}, \quad I)$$

where o may be 1 or 2 or 3 and the $R^1$ radicals may be the same or different and are selected from $C_1$-$C_{10}$ alkoxy groups,
$C_6$-$C_{20}$ phenoxy groups, $C_2$-$C_{10}$ cyclic dialkoxy groups, $C_2$-$C_{10}$ dialkoxy groups, $C_4$-$C_{10}$ cycloalkoxy groups, $C_6$-$C_{20}$ aryl groups,
$C_1$-$C_{10}$ alkyl groups, $C_2$-$C_{20}$ alkenyl groups, $C_2$-$C_{20}$ alkynyl groups,
$C_7$-$C_{20}$ aralkyl groups, halides or
alkyl polyether group —O—$(R^6$—O$)_r$—$R^7$, where the $R^6$ radicals are the same or different and are branched or unbranched, saturated or unsaturated, aliphatic, aromatic or mixed aliphatic/aromatic divalent $C_1$-$C_{30}$ hydrocarbon groups, r is an integer from 1 to 30 and the $R^7$ radicals are unsubstituted or substituted, branched or unbranched monovalent alkyl, alkenyl, aryl or aralkyl groups, or
two $R^1$ correspond to a dialkoxy group having 2 to 10 carbon atoms, in which case o is <3,
or two or more silanes of formula I) may be bridged via $R^1$ radicals or by condensation; and
with the condition that in formula I), there is at least one $R^1$ selected from those abovementioned options in which this $R^1$ i) is bonded to the silicon atom via an oxygen atom or ii) is a halide in each $(R^1)_o Si$— group;
and the $R^3$ and $R^4$ radicals may independently be the same or different and are branched or unbranched, saturated or unsaturated, aliphatic, aromatic or mixed aliphatic/aromatic $C_1$-$C_{30}$ hydrocarbon groups, where the indices p may independently assume values of 0 or 1;
and where X is a radical comprising at least one polar group selected from urethane, amide, ester, amine, thiourea, thioamide,
O-organyl thiocarbamate, S-organyl thiocarbamate, amidine, guanidine,
piperidine, maleic anhydride, sulfonamide, carbonate, imidazoline, thiazolidine, thiazolidinone, pyrrolidine, pyrazole, benzimidazole, indole, purine, thiazine, sulfonate, and phosphonate groups;
and where m assumes the value of 1 or 2 and where n is an integer from 1 to 10 and where $R^2$ is a hydrogen atom or a —C(=O)—$R^8$ group where $R^8$ is selected from hydrogen, $C_1$-$C_{20}$ alkyl groups, $C_6$-$C_{20}$ aryl groups, $C_2$-$C_{20}$ alkenyl groups and $C_7$-$C_{20}$ aralkyl groups.

It has been found that, surprisingly, the combination of the abovementioned constituents achieves an improvement in the trade-off between rolling resistance and wet grip, with other properties, such as hardness and stiffness in particular, remaining at a comparable same level or even likewise being improved, the particular result of which is comparable or even improved handling characteristics in the case of use in vehicle tires.

The present invention further provides a vulcanizate of at least one rubber mixture of the invention.

The present invention further provides a vehicle tire which comprises at least one vulcanizate of the invention of the rubber mixture of the invention in at least one component. The vehicle tire preferably includes the at least one vulcanizate at least in the tread.

The vulcanizate of the invention and the vehicle tire of the invention are notable for an improvement in the trade-off between rolling resistance and wet grip. At the same time, they have very good handling characteristics.

In the case of two-part treads (upper part: cap and lower part: base), the rubber mixture of the invention can be used both for the cap and for the base. Preferably, at least the cap or at least the base, or at least the cap and the base, include(s) at least one vulcanizate of the invention of the rubber mixture of the invention.

The rubber mixture of the invention is additionally also suitable for treads consisting of various tread mixtures arranged alongside one another and/or one on top of another (multicomponent tread).

Within the context of the present invention, "vehicle tires" are to be understood to mean pneumatic vehicle tires and solid rubber tires, including tires for industrial and construction site vehicles, truck, car and two-wheeled-vehicle tires.

Moreover, the rubber mixture of the invention is also suitable for other components of vehicle tires, for example the flange profile in particular, and also for inner tire components. Moreover, the rubber mixture of the invention is also suitable for other industrial rubber articles, such as bellows, conveyor belts, air springs, belts, drive belts or hoses, and also footwear soles.

There follows a detailed description of the constituents of the sulfur-crosslinkable rubber mixture of the invention. All the observations are equally applicable to the vulcanizate of the invention and to the vehicle tire of the invention, including at least one vulcanizate of the invention of the rubber mixture of the invention in at least one component.

The unit "phr" (parts per hundred parts of rubber by weight) used in this document is the standard unit of quantity for mixture recipes in the rubber industry. In this document, the dosage of the individual substituents is based on 100 parts by weight of the total mass of all rubbers present in the mixture that have a molecular weight $M_w$ by GPC of greater than 20000 g/mol.

The expression phf (parts per hundred parts of filler by weight) used in this text is the conventional unit of amount for coupling agents for fillers in the rubber industry.

In the context of the present application, phf relates to the silica present, meaning that any other fillers present, such as carbon black, are not included in the calculation of the amount of silane.

According to the invention, the rubber mixture is sulfur-crosslinkable, and for that purpose comprises at least one diene rubber.

Diene rubbers are rubbers which are formed by polymerization or copolymerization of dienes and/or cycloalkenes and thus have C=C double bonds either in the main chain or in the side groups.

The diene rubber here is preferably selected from the group consisting of natural polyisoprene and/or synthetic polyisoprene and/or epoxidized polyisoprene and/or butadiene rubber and/or butadiene-isoprene rubber and/or solution-polymerized styrene-butadiene rubber and/or emulsion-polymerized styrene-butadiene rubber and/or styrene-isoprene rubber and/or liquid rubbers having a molecular weight $M_w$ of greater than 20000 g/mol and/or halobutyl rubber and/or polynorbornene and/or isoprene-isobutylene copolymer and/or ethylene-propylene-diene rubber and/or nitrile rubber and/or chloroprene rubber and/or acrylate rubber and/or fluoro rubber and/or silicone rubber and/or polysulfide rubber and/or epichlorohydrin rubber and/or styrene-isoprene-butadiene terpolymer and/or hydrogenated acrylonitrile-butadiene rubber and/or hydrogenated styrene-butadiene rubber.

Nitrile rubber, hydrogenated acrylonitrile-butadiene rubber, chloroprene rubber, butyl rubber, halobutyl rubber or ethylene-propylene-diene rubber in particular are used in the production of industrial rubber articles, such as belts, drive belts and hoses, and/or footwear soles. The mixture compositions known to those skilled in the art for these rubbers, which are specific in terms of fillers, plasticizers, vulcanization systems and additives, are preferably employed.

The rubber mixture is suitable in particular for vehicle tires and may in principle be used in any component, such as in particular the tread, the sidewall, the flange profile, and also in other so-called body components.

The diene rubber is preferably selected from the group consisting of natural polyisoprene (NR), synthetic polyisoprene (IR), butadiene rubber (BR), solution-polymerized styrene-butadiene rubber (SSBR), emulsion-polymerized styrene-butadiene rubber (ESBR), butyl rubber (IIR) and halobutyl rubber.

In a particularly preferred embodiment of the invention, the diene rubber is selected from the group consisting of natural polyisoprene (NR), synthetic polyisoprene (IR), butadiene rubber (BR), solution-polymerized styrene-butadiene rubber (SSBR) and emulsion-polymerized styrene-butadiene rubber (ESBR). A rubber mixture of this kind is especially suitable for the tread of vehicle tires.

In a particularly advantageous embodiment of the invention, the rubber mixture comprises at least one natural polyisoprene, preferably in amounts of 2 to 100 phr, and in one particularly advantageous embodiment of the invention 5 to 30 phr, very preferably 5 to 15 phr. Particularly good processibility of the rubber mixture of the invention and optimized tensile properties are achieved in this way.

In a particularly advantageous embodiment of the invention, the rubber mixture comprises at least one polybutadiene (butadiene rubber), preferably in amounts of 2 to 100 phr, and in a particularly advantageous embodiment of the invention 5 to 50 phr, very preferably 10 to 25 phr. Particularly good abrasion and tensile properties of the rubber mixture of the invention and good processibility coupled with low hysteresis loss are achieved in this way.

In a particularly advantageous embodiment of the invention, the rubber mixture comprises at least one styrene-butadiene rubber (SBR), preferably in amounts of 2 to 100 phr, and in a particularly advantageous embodiment of the invention 25 to 90 phr, very preferably 65 to 90 phr. Good processibility coupled with low hysteresis loss, and also good abrasion and tensile properties, are achieved in this way in the rubber mixture of the invention.

The SBR in this case is preferably an SSBR, producing optimized hysteresis properties.

In a particularly advantageous embodiment of the invention, the rubber mixture comprises a polymer blend of two or more of the stated rubbers NR, BR and SBR, preferably SSBR, and does so in any conceivable combinations, with the sum of all the rubbers present adding up to 100 phr.

In a particularly advantageous embodiment, the rubber mixture comprises 5 to 20 phr of at least one natural polyisoprene and/or at least one synthetic polyisoprene and 50 to 95 phr of at least one styrene-butadiene rubber. This includes the case that the sum total is 100 phr and that further rubbers are present, in which case 100 phr is by definition the sum total of the amounts of all solid rubbers.

The natural and/or synthetic polyisoprene of all embodiments may be either cis-1,4-polyisoprene or 3,4-polyisoprene. However, the use of cis-1,4-polyisoprenes having a cis-1,4 proportion of >90% by weight is preferred. Such a polyisoprene is firstly obtainable by stereospecific polymerization in solution with Ziegler-Natta catalysts or using finely divided lithium alkyls. Secondly, natural rubber (NR) is one such cis-1,4-polyisoprene, for which the cis-1,4 content in the natural rubber is greater than 99% by weight.

A mixture of one or more natural polyisoprenes with one or more synthetic polyisoprenes is further also conceivable.

If the rubber mixture of the invention contains butadiene rubber (i.e. BR, polybutadiene), this may be any of the types known to those skilled in the art. These include inter alia the so-called high-cis and low-cis types, wherein polybutadiene having a cis content of not less than 90% by weight is referred to as high-cis type and polybutadiene having a cis content of less than 90% by weight is referred to as low-cis type. An example of a low-cis polybutadiene is Li—BR (lithium-catalyzed butadiene rubber) having a cis content of 20% to 50% by weight. Particularly good abrasion properties and low hysteresis of the rubber mixture are achieved with a high-cis BR.

The polybutadiene(s) employed may be end group-modified with modifications and functionalizations and/or be functionalized along the polymer chains. The modification may be selected from modifications with hydroxyl groups and/or ethoxy groups and/or epoxy groups and/or siloxane groups and/or amino groups and/or aminosiloxane and/or carboxyl groups and/or phthalocyanine groups and/or silane-sulfide groups. However, other modifications known to those skilled in the art, also known as functionalizations, are also suitable. Metal atoms may be a constituent of such functionalizations.

In the case where at least one styrene-butadiene rubber (styrene-butadiene copolymer) is present in the rubber mixture, this may be selected from solution-polymerized styrene-butadiene rubber (SSBR) and emulsion-polymerized styrene-butadiene rubber (ESBR), a mixture of at least one SSBR and at least one ESBR also being employable. The terms "styrene-butadiene rubber" and "styrene-butadiene copolymer" are used synonymously in the context of the present invention.

The styrene-butadiene copolymer used may be end group-modified and/or functionalized along the polymer chains with the modifications and functionalizations recited above for the polybutadiene.

According to the invention, the rubber mixture comprises at least one silica.

The silica may be any of the types of silica known to those skilled in the art that are suitable as filler for tire rubber mixtures. However, particular preference is given to using a finely divided, precipitated silica which has a nitrogen surface area (BET surface area) (in accordance with DIN ISO 9277 and DIN 66132) of 35 to 400 m$^2$/g, preferably 35 to 350 m²/g, more preferably 85 to 320 m²/g and most preferably 120 to 235 m²/g, and a CTAB surface area (in accordance with ASTM D 3765) of 30 to 400 m²/g, preferably 30 to 330 m²/g, more preferably 80 to 300 m²/g and most preferably 115 to 200 m²/g. Such silicas lead, for example in rubber mixtures for tire treads, to particularly good physical properties of the vulcanizates. Advantages in mixture processing by way of a reduction in mixing time can also result here while retaining the same product properties, leading to improved productivity. Silicas used may thus, for example, be either those of the Ultrasil® VN3 type (trade name) from Evonik or highly dispersible silicas known as HD silicas (e.g. Zeosil® 1165 MP from Solvay).

The rubber mixture of the invention, in a preferred embodiment of the invention, contains 3 to 500 phr, preferably 3 to 400 phr, preferably 5 to 300 phr, of at least one silica.

In a preferred embodiment, the rubber mixture contains 10 to 200 phr and most preferably 20 to 180 phr of at least one silica.

Especially with a comparatively high amount of silica of 500 phr or 400 phr or 300 phr or 200 phr or 180 phr, in combination with the silane which is present in accordance with the invention and is elucidated in detail below, particularly advantageous properties arise with regard to the tire properties of the rubber mixture and vulcanizates thereof, especially optimized rolling resistance and wet grip predictors.

Where at least two different silicas, differing, for example, in their BET surface area, are present in the rubber mixture of the invention, the quantity figures stated always refer to the total amount of all silicas present.

The terms "silicic acid" and "silica" are used synonymously in the context of the present invention.

The rubber mixture of the invention may also comprise at least one carbon black, especially an industrial carbon black.

Possible carbon blacks are all types of carbon black known to a person familiar with the technical field.

In one embodiment, the carbon black has an iodine number in accordance with ASTM D 1510, which is also referred to as iodine adsorption number, between 30 and 250 g/kg, preferably 30 to 180 g/kg, more preferably 40 to 180 g/kg, and most preferably 40 to 130 g/kg, and a DBP number in accordance with ASTM D 2414 of 30 to 200 ml/100 g, preferably 70 to 200 ml/100 g, more preferably 90 to 200 ml/100 g.

The DBP number in accordance with ASTM D 2414 determines the specific absorption volume of a carbon black or a light-colored filler by means of dibutyl phthalate.

The use of such a type of carbon black in the rubber mixture, in particular for vehicle tires, ensures the best possible compromise between abrasion resistance and heat buildup, which in turn influences the ecologically relevant rolling resistance. Preference is given here to only one type of carbon black being used in the respective rubber mixture, but it is also possible to mix various types of carbon black into the rubber mixture. The total amount of carbon blacks present may be 0.1 to 250 phr.

In an advantageous embodiment of the invention, the rubber mixture contains 0 or 0.1 to 20 phr, preferably 0 or 0.1 to 10 phr, of at least one carbon black and 30 to 500 phr, preferably 30 to 200 phr, of at least one silica.

In a further advantageous embodiment of the invention, the rubber mixture contains 30 to 150 phr of at least one carbon black and 10 to 50 phr of at least one silica, and hence is a part-silica mixture.

The rubber mixture of the invention may contain further fillers, for example in amounts of 0.1 to 50 phr. Within the context of the present invention, the further (non-reinforcing) fillers include aluminosilicates, kaolin, chalk, starch, magnesium oxide, titanium dioxide, or rubber gels and also fibers (such as for example aramid fibers, glass fibers, carbon fibers, cellulose fibers).

Further, optionally reinforcing, fillers are for example carbon nanotubes ((CNTs), including discrete CNTs, so-called hollow carbon fibers (HCF) and modified CNTs containing one or more functional groups such as hydroxy, carboxy and carbonyl groups), graphite and graphene and what is known as "carbon-silica dual-phase filler".

In the context of the present invention zinc oxide is not included among the fillers.

The rubber mixture of the invention contains at least one silane having the general empirical formula I):

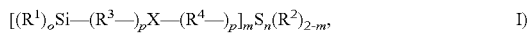

$$[(R^1)_oSi-(R^3-)_pX-(R^4-)_p]_mS_n(R^2)_{2-m},\quad \text{I)}$$

where o may be 1 or 2 or 3 and the $R^1$ radicals may be the same or different and are selected from $C_1$-$C_{10}$ alkoxy groups,
$C_6$-$C_{20}$ phenoxy groups, $C_2$-$C_{10}$ cyclic dialkoxy groups, $C_2$-$C_{10}$ dialkoxy groups, $C_4$-$C_{10}$ cycloalkoxy groups, $C_6$-$C_{20}$ aryl groups,
$C_1$-$C_{10}$ alkyl groups, $C_2$-$C_{20}$ alkenyl groups, $C_2$-$C_{20}$ alkynyl groups,
$C_7$-$C_{20}$ aralkyl groups, halides or
alkyl polyether group —O— $(R^6$—O$)_r$—$R^7$, where the $R^6$ radicals are the same or different and are branched or unbranched, saturated or unsaturated, aliphatic, aromatic or mixed aliphatic/aromatic divalent $C_1$-$C_{30}$ hydrocarbon groups, r is an integer from 1 to 30 and the $R^7$ radicals are unsubstituted or substituted, branched or unbranched monovalent alkyl, alkenyl, aryl or aralkyl groups, or
two $R^1$ correspond to a dialkoxy group having 2 to 10 carbon atoms, in which case o is <3,
or two or more silanes of formula I) may be bridged via $R^1$ radicals or by condensation; and
with the condition that in formula I), there is at least one $R^1$ selected from those abovementioned options in which this $R^1$ i) is bonded to the silicon atom via an oxygen atom or ii) is a halide in each $(R^1)_oSi$— group;
and the $R^3$ and $R^4$ radicals may independently be the same or different and are branched or unbranched, saturated or unsaturated, aliphatic, aromatic or mixed aliphatic/aromatic $C_1$-$C_{30}$ hydrocarbon groups, where the indices p may independently assume values of 0 or 1;
and where X is a radical comprising at least one polar group selected from urethane, amide, ester, amine, thiourea, thioamide,
O-organyl thiocarbamate, S-organyl thiocarbamate, amidine, guanidine,
piperidine, maleic anhydride, sulfonamide, carbonate, imidazoline, thiazolidine, thiazolidinone, pyrrolidine, pyrazole, benzimidazole, indole, purine, thiazine, sulfonate, and phosphonate groups;
and where m assumes the value of 1 or 2 and where n is an integer from 1 to 10 and where $R^2$ is a hydrogen atom or a —C(=O)—$R^8$ group where $R^8$ is selected from hydrogen, $C_1$-$C_{20}$ alkyl groups, $C_6$-$C_{20}$ aryl groups, $C_2$-$C_{20}$ alkenyl groups and $C_7$-$C_{20}$ aralkyl groups.

This silane of formula I), in the rubber mixture of the invention, serves
a) as coupling agent for attachment of the silica present in the rubber mixture to the polymer chains of the diene rubber(s)

and/or b) for surface modification of silica by attachment to the silica particles without attachment to the polymer chains.

Silane coupling agents are common knowledge and react with the surface silanol groups of the silica or other polar groups during the mixing of the rubber or rubber mixture (in situ) or in the manner of a pretreatment (premodification) actually before the addition of the filler to the rubber. Some silanes can additionally become attached to polymer chains of the rubber(s).

It is essential to the invention that the silane having the abovementioned empirical formula I) has an X radical comprising a polar group as specified in detail above. This polar group is part of the spacer group —$(R^3)_p$—X—$(R^4)_p$— that joins the silicon atom(s) to a sulfur atom of the $S_n$ moiety. In the art, such a linking group is also called a spacer since it determines the distance between silicon (attachment to the filler) and sulfur (attachment to the diene rubber).

According to the invention, the polar group is selected from
urethane, amide, ester, amine, thiourea, thioamide,
O-organyl thiocarbamate, S-organyl thiocarbamate, amidine, guanidine,
piperidine, maleic anhydride, sulfonamide, carbonate, imidazoline, thiazolidine, thiazolidinone, pyrrolidine, pyrazole, benzimidazole, indole, purine, thiazine, sulfonate, and phosphonate groups.

Surprisingly, silanes of formula I) present in accordance with the invention, compared to silanes having other polar groups, such as, more particularly, compared to a polar urea group, in the spacer group between silicon and sulfur achieve improvements in the indicators for rolling resistance and wet grip, especially also achieving an improvement in the trade-off between the properties mentioned. Thus, the rubber mixture of the invention comprising at least one silane of formula I) is at a higher level of properties, especially with regard to rolling resistance and wet grip predictors.

What is meant here by "X radical having at least one polar group" is that this X radical has at least one polar functionality as detailed in accordance with the invention, but may optionally additionally have further functionalities or hydrocarbon moieties. The latter may especially be present in the case of branched X radicals of complex structure, especially as secondary groups.

The polar groups mentioned are incorporated here into the structure, which means that the nomenclature may formally result in names other than those specified.

The $R^3$ and $R^4$ radicals here are additional hydrocarbon moieties that may or may not be present, as described below.

The heteroatoms of the polar functionality result in greater polarity within the molecule compared to spacer groups devoid of heteroatoms, such as alkyl groups, which gives rise to the term "polar" in the context of the present invention. Hydrocarbyl radicals without heteroatoms are generally classified as nonpolar in the art.

The expression "polar" should be regarded as an additional description of the group of the X radical, the feature essential to the invention being the chemical specification of the group.

In the rubber mixture of the invention, the abovementioned silane of formula I) may also wholly or partly replace the nonpolar silanes having typically a propylene group only as spacer group that are comparatively well known in the art, such as TESPD (3,3'-bis(triethoxysilylpropyl) disulfide) or TESPT (3,3'-bis(triethoxysilylpropyl) tetrasulfide) or octyltriethoxysilanes (e.g. Si208®, from Evonik) or mercaptosilanes, such as 3-mercaptopropyltriethoxysilane (e.g. Si263®, from Evonik), or blocked mercaptosilanes, such as 3-octanoylthio-1-propyltriethoxysilane (e.g. NXT silane, from Momentive), with a simultaneous increase in stiffness and better processability, for example a shorter full vulcanization time $t_{90}$.

The amount of the at least one silane of formula I) is preferably 1 to 30 phf, preferably 1 to 22 phf, more preferably 2 to 18.5 phf, most preferably 2 to 10 phf.

If the rubber mixture contains two or more different silanes of formula I), the stated amounts relate to the total amount of silanes of formula I) present.

It is also conceivable in the context of the present invention that the abovementioned silane having the general empirical formula I) is used in combination with one or more silanes from the prior art.

In particularly advantageous embodiments, X is a radical comprising at least one polar group selected from urethane, amide, ester, ether, amine, thiourea, thioamide, O-organyl thiocarbamate, S-organyl thiocarbamate, amidine, guanidine, piperidine, maleic anhydride, sulfonamide, carbonate groups.

In this way, particularly good properties of the rubber mixture are achieved, especially improved rolling resistance indicators with comparable or even improved other properties.

In particularly advantageous embodiments, X is a radical comprising at least one polar group selected from urethane and amide groups.

In this way, particularly good properties of the rubber mixture are achieved, especially improved rolling resistance indicators with comparable or even improved hardness and stiffness.

In preferred embodiments, n is an integer from 2 to 10, more preferably from 2 to 8. Preferably again from 2 to 6, most preferably from 2 to 4. A silane of formula I) with n of not less than 2 has the additional advantage that the vulcanization can open up the sulfur-sulfur bonds, such that the silane can take part in the sulfur vulcanization and can bind to the polymer(s).

In a particularly advantageous embodiment of the invention, n is 2. This results in particularly good properties with regard to the predictors for rolling resistance, wet grip and the other properties, such as stiffness.

There may also be two or more silanes of formula I) with different values for n in a mixture, which may result in a fraction on average for n.

The sulfur content (value of n) is determined by means of $^1$H NMR.

The index m may assume the values of 1 or 2. Thus, the group

$$[(R^1)_oSi\text{—}(R^3\text{—})_pX\text{—}(R^4\text{—})_p] \qquad V)$$

may occur once or twice per molecule.

In an advantageous embodiment of the invention, m is 2, which means that the sulfur is bonded to two groups V), and so no $R^2$ radical is present in the molecule in this case. The two groups V) are then joined via the $S_r$ moiety with n=1 to 10, i.e. via a sulfur atom or a chain of 2 to 10 sulfur atoms. Preferably, n here is an integer from 2 to 10, more preferably from 2 to 8. Preferably again from 2 to 6, most preferably from 2 to 4.

In a further advantageous embodiment of the invention, m is 1, and preferably at the same time n is 1.

If m=1, this means that an $R^2$ radical is bonded to the sulfur atom furthest removed from the silyl group.

$R^2$ is a hydrogen atom or a —C(=O)—$R^8$ group where $R^8$ is selected from hydrogen, $C_1$-$C_{20}$ alkyl groups, $C_6$-$C_{20}$ aryl groups, $C_2$-$C_{20}$ alkenyl groups and $C_7$-$C_{20}$ aralkyl groups.

The moiety —C(=O)—$R^8$ group here is a protecting group, such that the resulting silane can also be referred to as protected or blocked mercaptosilane.

When $R^2$ is a hydrogen atom, this is a blocked (unprotected) mercaptosilane.

It is also possible for there to be various silanes with various options for $R^2$ in the mixture.

Preferably, $R^2$ is a —C(=O)—$R^8$ group where $R^8$ is more preferably a $C_1$-$C_{20}$ alkyl group; $R^2$ here is thus an alkanoyl group.

In an advantageous embodiment, the alkanoyl group has a total of 1 to 3 and especially 2 carbon atoms.

In a further advantageous embodiment, the alkanoyl group has a total of 7 to 9 and especially 8 carbon atoms.

In the context of the present invention, silyl group is understood to mean the moiety $$(R^1)_o Si—. \qquad \text{IV)}$$

All the $R^1$ radicals and bridges mentioned from one or more silanes via $R^1$ radicals may be combined with one another within a silyl group.

If two $R^1$ correspond to a dialkoxy group having 2 to 10 carbon atoms and then o<3 (o is less than 3), the silicon atom is part of a ring system.

If two silanes of formula I) are bridged to one another, they share an $R^1$ radical or are joined to one another via an oxygen atom by combination of two Si—$R^1$— groups. It is also possible for more than two silanes to be joined to one another in this way. Following the synthesis of the silane of formula I), it is therefore conceivable for two silanes of formula I) to be bridged to each other via an oxygen atom or the $R^1$ radicals. It is also possible for more than two silanes to be joined to one another in this way, such as for example via dialkoxy groups.

The rubber mixture of the invention may thus also contain oligomers that form through hydrolysis and condensation or through bridging by means of dialkoxy groups as $R^1$ of the silanes of the formula I).

The silanes of the formulae I), by virtue of the condition that, in the formula I), there is at least one $R^1$ selected from those abovementioned options in which this $R^1$ i) is bonded to the silicon atom via an oxygen atom or ii) is a halide in each $(R^1)_o Si—$ group, comprise in each case at least one $R^1$ radical that can serve as leaving group.

More particularly, these are thus alkoxy groups, phenoxy groups or all other groups mentioned that are bonded to the silicon atom by an oxygen atom, or halides.

The $R^1$ radicals preferably comprise alkyl groups having 1 to 10 carbon atoms ($C_1$-$C_{10}$ alkyl group) or alkoxy groups having 1 to 10 carbon atoms ($C_1$-$C_{10}$ alkoxy group), or halides, more preferably alkoxy groups having 1 to 10 carbon atoms ($C_1$-$C_{10}$ alkoxy group).

In preferred embodiments, at least one $R^1$ in each silyl group IV) is a $C_1$-$C_{10}$ alkoxy group, preferably $C_1$-$C_6$ alkoxy group.

In a particularly advantageous embodiment of the invention, the $R^1$ radicals within a silyl group $(R^1)_o Si—$ are the same and are alkoxy groups having 1 or 2 carbon atoms, i.e. methoxy groups or ethoxy groups, most preferably ethoxy groups, where o is 3.

However, including in the case of oligomers or if two $R^1$ form a dialkoxy group, the remaining $R^1$ radicals are preferably alkyl groups having 1 to 10 carbon atoms or halides or alkoxy groups having 1 to 10 carbon atoms, preferably 1 or 2 carbon atoms, i.e. methoxy groups or ethoxy groups, most preferably ethoxy groups.

In the context of the present invention, ethoxy groups in the formulae of the silanes are abbreviated to EtO or OEt. The two syntaxes illustrate that alkoxy groups such as ethoxy groups are bonded to the silicon atom Si via the oxygen atom O.

In principle, however, the abbreviations OEt and EtO can be used synonymously in the context of the present invention.

The $R^3$ and $R^4$ radicals, in advantageous embodiments, are preferably alkylene groups having 1 to 30, preferably 1 to 10, carbon atoms.

The $R^3$ radical(s), in particularly preferred embodiments, are alkylene groups having two or three carbon atoms, especially n-propylene radicals.

The $R^4$ radical(s), in particularly preferred embodiments, are alkylene groups having 1 to 3, preferably 1 or 2, carbon atoms.

The indices p may independently assume the values of 0 or 1, meaning that the $R^3$ and $R^4$ radicals are each independently present or absent in the molecule.

If there is no carbon atom between a polar group encompassed within the X radical in accordance with the invention and the silyl group or the $S_n$ group, the respective $R^3$ or $R^4$ radical is absent and the corresponding p is thus 0.

In a preferred embodiment of the invention, the silane has the following structure of formula II):

$$(EtO)_3Si\diagup\diagup\diagup NH\diagdown C(=O)\diagdown O\diagup\diagup S\diagdown S\diagup\diagup O\diagdown C(=O)\diagdown NH\diagup\diagup\diagup Si(EtO)_2 \qquad \text{II)}$$

In this case: m is 2, n is 2, o is 3, all $R^1$ are ethoxy, all p are 1, $R^3$ on both sides is a propylene group, $R^4$ on both sides is an ethylene group, and X is a urethane group. The X radical here thus does not comprise any additional groups aside from the polar functionality.

A silane of formula II) resolves the trade-off between rolling resistance and wet grip to a particularly high degree, i.e. the rubber mixture has a particularly high level of properties. At the same time, the rubber mixture comprising a silane of formula II) has comparable or even elevated stiffness, especially at elevated temperatures and temperatures that can occur in driving operation. These are again indicators of improved handling characteristics.

In a preferred embodiment of the invention, the silane has the following structure of formula III):

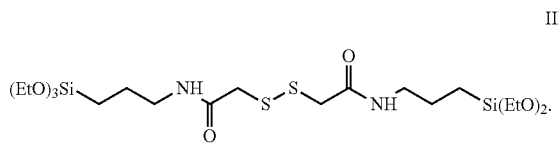

In this case: m is 2, n is 2, o is 3, all $R^1$ are ethoxy, all p are 1, $R^3$ on both sides is a propylene group, $R^4$ on both sides is a methylene group, and X is an amide group. The X radical here thus does not comprise any additional groups aside from the polar functionality.

A silane of formula III) resolves the trade-off between rolling resistance and wet grip to a high degree, i.e. the rubber mixture has a high level of properties, especially with very good rolling resistance indicators. At the same time, the rubber mixture comprising a silane of formula III) has comparable or even elevated stiffness and hence improved handling indicators. Moreover, a rubber mixture containing at least one silane of formula III) has a shortened full vulcanization time $t_{90}$, which results in a saving of energy, time and thus costs in the production of the rubber mixture or vulcanizates thereof.

It is also conceivable that the rubber mixture of the invention contains a mixture of the silanes of the formulae II) and III).

It is also conceivable that the rubber mixture of the invention contains a mixture of the silanes of the formulae II) and III) with at least one further silane of the parent formula I).

The total amount of silanes covered by the formula I) present is in each case 1 to 30 phf, preferably 1 to 22 phf, more preferably 2 to 18.5 phf, most preferably 2 to 10 phf.

In an advantageous development of the invention, the amount of silanes present (one or more) of formula I) is at least 2.5 phf.

In a further advantageous development of the invention, the amount of silanes present (one or more) of formula I) is at least 3 phf.

In a further advantageous development of the invention, the amount of silanes present (one or more) of formula I) is at least 3.5 phf.

Especially the preferred and particularly preferred amounts and the developments or embodiments mentioned result in very good rolling resistance indicators with a simultaneous improvement in the trade-off between rolling resistance and wet grip indicators, and very good handling predictors.

The silane(s) of formula I) present in accordance with the invention may have been applied to a support, for example wax, polymer or carbon black, and may have been added to the rubber mixture in that form. The silane(s) of formula I) present in accordance with the invention may have been applied to a silica, in which case the attachment may be physical or chemical. The application of the silanes present in accordance with the invention to silica reduces, for example, the emission of volatile by-products, such as ethanol in the case of use of ethoxy-substituted silanes ($R^1$=ethoxy).

The rubber mixture may also contain further activators and/or agents for binding fillers, in particular carbon black. This may be, for example, the compound S-(3-aminopropyl) thiosulfuric acid disclosed in EP 2589619 A1 for example and/or metal salts thereof, whereby very good physical properties of the rubber mixture, especially in combination with at least one carbon black as filler, are achieved.

The rubber mixture can further contain customary additives in customary parts by weight which during the production of said mixture are added preferably in at least one base-mixing stage. These additives include a) aging stabilizers, such as those of the family of the PPDs (phenylenediamines), and in this case for example N-phenyl-N'-(1,3-dimethylbutyl)-p-phenylenediamine (6PPD), N,N'-diphenyl-p-phenylenediamine (DPPD), N,N'-ditolyl-p-phenylenediamine (DTPD), N-isopropyl-N'-phenyl-p-phenylenediamine (IPPD), 2,2,4-trimethyl-1,2-dihydroquinoline (TMQ), b) activators, such as for example zinc oxide and fatty acids (e.g. stearic acid) and/or other activators, such as zinc complexes, such as for example zinc ethylhexanoate, c) waxes, d) hydrocarbon resins, such as, optionally, tackifier resins in particular, e) masticating aids, such as for example 2,2'-dibenzamidodiphenyl disulfide (DBD), and f) processing aids, such as in particular fatty acid esters and metal soaps, such as for example zinc soaps and/or calcium soaps, g) plasticizers.

The plasticizers used in the context of the present invention include all the plasticizers that are known to those skilled in the art, such as aromatic, naphthenic or paraffinic mineral oil plasticizers, for example MES (mild extraction solvate) or RAE (residual aromatic extract) or TDAE (treated distilled aromatic extract), or rubber-to-liquid oils (RTL) or biomass-to-liquid oils (BTL) preferably having a content of polycyclic aromatics of less than 3% by weight according to method IP 346 or triglycerides, for example rapeseed oil or factices or hydrocarbon resins or liquid polymers having a mean molecular weight (determination by GPC=gel permeation chromatography, in accordance with BS ISO 11344:2004) between 500 and 20000 g/mol. If additional liquid polymers are used as plasticizers in the rubber mixture of the invention, these are not counted as rubber in the calculation of the composition of the polymer matrix.

The plasticizer is preferably selected from the group consisting of the abovementioned plasticizers.

It is particularly preferable when the plasticizer is selected from the group consisting of hydrocarbon resins, liquid polymers and mineral oils.

When using mineral oil this is preferably selected from the group consisting of DAE (distilled aromatic extracts) and/or RAE (residual aromatic extract) and/or TDAE (treated distilled aromatic extracts) and/or MES (mild extracted solvents) and/or naphthenic oils.

In a preferred embodiment of the invention the rubber mixture contains at least one mineral oil plasticizer, preferably at least TDAE and/or RAE, as a plasticizer. This results in particularly good processability characteristics, in particular good miscibility of the rubber mixture.

In a preferred embodiment of the invention the rubber mixture comprises at least one liquid polymer as a plasticizer.

In a preferred embodiment of the invention the rubber mixture comprises at least one hydrocarbon resin as a plasticizer.

It will be clear to those skilled in the art that hydrocarbon resins are polymers constructed from monomers, wherein the hydrocarbon resin is formally constructed from derivatives of the monomers by linkage of the monomers to one another. However, these hydrocarbon resins do not count as rubbers in the context of the present invention. In the context of the present application the term "hydrocarbon resins" comprises resins comprising carbon atoms and hydrogen atoms and optionally heteroatoms, such as especially oxygen atoms. The hydrocarbon resin may be a homopolymer or a copolymer. In the present application the term "homopolymer" is to be understood as meaning a polymer which, according to Rompp Online Version 3.28, "has formed from monomers of only one type". The monomers may be any monomers of hydrocarbon resins that are known to those skilled in the art, such as aliphatic $C_5$ monomers, further unsaturated compounds capable of cationic polymerization containing aromatics and/or terpenes and/or alkenes and/or cycloalkenes.

In a preferred embodiment of the invention the hydrocarbon resin is selected from the group consisting of aliphatic $C_5$ resins and hydrocarbon resins formed from alpha-methylstyrene and styrene.

The hydrocarbon resin preferably has an ASTM E 28 (ring and ball) softening point of 10° C. to 180° C., particularly preferably of 60° C. to 150° C., very particularly preferably of 80° C. to 99° C. Moreover, the hydrocarbon resin preferably has a molecular weight Mw of 500 to 4000 g/mol, preferably of 1300 to 2500 g/mol.

The total amount of further additives is 3 to 150 phr, preferably 3 to 100 phr and particularly preferably 5 to 80 phr.

Zinc oxide (ZnO) may be included in the overall proportion of the further additives.

This may be any type of zinc oxide known to those skilled in the art, such as for example ZnO granules or powder. The zinc oxide conventionally used generally has a BET surface area of less than 10 m²/g. However, it is also possible to use a zinc oxide having a BET surface area of 10 to 100 m²/g, for example so-called "nano zinc oxides".

Particularly when the rubber mixture of the invention is used for the internal components of a tire or an industrial rubber article which come into direct contact with strengthening elements present, a suitable bonding system, often in the form of tackifying resins, is generally also added to the rubber mixture.

The vulcanization is preferably carried out in the presence of sulfur and/or sulfur donors and with the aid of vulcanization accelerators, with some vulcanization accelerators simultaneously being able to act as sulfur donors.

Sulfur and/or further sulfur donors and also one or more accelerators are added to the rubber mixture in the last mixing step. The accelerator is selected from the group consisting of thiazole accelerators and/or mercapto accelerators and/or sulfenamide accelerators and/or thiocarbamate accelerators and/or thiuram accelerators and/or thiophosphate accelerators and/or thiourea accelerators and/or xanthogenate accelerators and/or guanidine accelerators and/or polyetheramine accelerators.

Preference is given to using at least one sulfenamide accelerator selected from the group consisting of N-cyclohexyl-2-benzothiazolesulfenamide (CBS) and/or N,N-dicyclohexylbenzothiazole -2-sulfenamide (DCBS) and/or benzothiazyl-2-sulfenomorpholide (MBS) and/or N-tert-butyl-2-benzothiazylsulfenamide (TBBS).

The sulfur donor substances used may be any sulfur donor substances known to those skilled in the art. If the rubber mixture comprises a sulfur-donating substance, it is preferably selected from the group comprising, for example, thiuram disulfides, for example tetrabenzylthiuram disulfide (TBzTD) and/or tetramethylthiuram disulfide (TMTD) and/or tetraethylthiuram disulfide (TETD), and/or thiuram tetrasulfides, for example dipentamethylenethiuram tetrasulfide (DPTT), and/or dithiophosphates, for example DipDis (bis(diisopropyl)thiophosphoryl disulfide) and/or bis(O,O-2-ethylhexylthiophosphoryl) polysulfide (e.g. Rhenocure SDT 50®, Rheinchemie GmbH) and/or zinc dichloryldithiophosphate (e.g. Rhenocure ZDT/S®, Rheinchemie GmbH) and/or zinc alkyldithiophosphate, and/or 1,6-bis(N, N-dibenzylthiocarbamoyldithio)hexane and/or diaryl polysulfides and/or dialkyl polysulfides.

Further network-forming systems such as can be obtained for example under the trade names Vulkuren®, Duralink® or Perkalink®, or network-forming systems such as are described in WO 2010/049216 A2, can also be used in the rubber mixture. This system contains a vulcanizing agent which crosslinks with a functionality of greater than four and at least one vulcanization accelerator.

The required amount of further sulfur in the form of elemental sulfur and/or further sulfur donors depends on the field of use of the respective rubber mixture. The respective amounts to be added are known to those skilled in the art. When elemental sulfur is added, the amounts in the case of a rubber mixture for the bead of vehicle tires are, for example, 0 to 5 phr. In the case of treads of vehicle tires, which generally have a lower sulfur content than the bead, the amount of elemental sulfur to be added is preferably 0 to 4 phr.

In an advantageous development of the invention, a plurality of accelerators are used.

In an advantageous embodiment of the invention, a sulfenamide accelerator, more preferably CBS, is used in combination with the guanidine accelerator DPG (diphenylguanidine). The amount of DPG is 0 to 5 phr, preferably 0.1 to 3 phr, more preferably 0.5 to 2.5 phr, most preferably 1 to 2.5 phr.

In a further advantageous embodiment of the invention, a sulfenamide accelerator, more preferably CBS, is used in combination with polyetheramine accelerators (for example Jeffamine® D230). The amount of polyetheramine accelerators (for example Jeffamine® D230) here is 0.1 to 5 phr, preferably 0.1 to 3 phr, more preferably 0.5 to 2.5 phr, most preferably 1 to 2.5 phr.

Vulcanization retarders may also be present in the rubber mixture.

The terms "vulcanized" and "crosslinked" are used synonymously in the context of the present invention.

The above-described rubber mixture of the invention is particularly suitable for use in vehicle tires, especially pneumatic vehicle tires. Conceivable in principle here is the application in all tire components, especially in a tread, more particularly in the cap of a tread with cap/base construction, as already described above.

For use in vehicle tires, the mixture, as a finished mixture prior to vulcanization, is preferably brought into the shape of a tread and is applied in the known manner during production of the green vehicle tire.

The production of the rubber mixture of the invention, for use as a sidewall or other body mixture in vehicle tires, is effected as has already been described. The difference lies in the shaping after the extrusion operation/the calendering of the mixture. The shapes thus obtained of the as-yet unvulcanized rubber mixture for one or more different body mixtures then serve for the construction of a green tire.

"Body mixture" refers here to the rubber mixtures for the other components of a tire, such as essentially separating plate, inner liner (inner layer), core profile, breaker belt, shoulder, breaker belt profile, carcass, bead reinforcement, bead profile, flange profile and bandage. For use of the rubber mixture of the invention in drive belts and other belts, especially in conveyor belts, the extruded, as-yet unvulcanized mixture is brought into the appropriate shape and often provided at the same time or subsequently with strength members, for example synthetic fibers or steel cords. This usually affords a multi-ply construction consisting of one and/or more plies of rubber mixture, one and/or more plies of identical and/or different strength members and one and/or more further plies of the same and/or another rubber mixture.

The invention is now to be elucidated in detail with reference to comparative examples and working examples, which are summarized in the tables that follow.

The comparative mixtures are identified with a V, the inventive mixtures with an E. The amount of the silanes in phf is based on 95 phr of silica. The rubber mixtures of the invention contain the silane of formula II) (urethane silane$^d$)) or of formula III) (amide silane$^e$)).

The urethane silane$^d$) of formula II) was prepared in accordance with US 2003/0191270 A1, and example 1 cited therein.

The amide silane$^e$) of formula III) was prepared as follows:

First Stage:
184.2 g of thioglycolic acid was initially charged in 600 g of water. 160 g of 50%
sodium hydroxide solution was metered in gradually. At 15±5° C., 98.1 g of 35%
hydrogen peroxide was metered in gradually (significant exothermicity). Then 214 g of
32% hydrochloric acid was used to adjust the pH to 2.0.

Then the mixture was extracted repeatedly with methyl tert-butyl ether, and the organic phase was concentrated. 164 g of bis(carboxymethyl) disulfide was obtained with a melting point of 102° C.

Second Stage:
136.65 g of bis(carboxymethyl) disulfide from the first stage was initially charged. 267.8 g of
thionyl chloride was added and heated up. The reaction commenced at 56° C.
with evolution of gas. After a good 1 hour at 70° C., the evolution of gas had ended.

The mixture was stirred at 70° C. for a further 1 hour.
Then the excess thionyl chloride was distilled off at 50 mbar up to 80° C. The acid chloride was obtained as an oil. This was dissolved in 370 g of dichloromethane.

Third Stage:
In a second reactor, 334.3 g of aminopropyltriethoxysilane and 158.5 g of triethylamine were dissolved in 370 g of dichloromethane. At 40° C., over the course of about 2 hours, the acid chloride solution from the second stage was metered in. In the course of the reaction that set in spontaneously, triethylammonium chloride precipitated out. Further reaction was effected at 40° C. overnight. The precipitated triethylammonium chloride was filtered off and washed with dichloromethane.

The product solution was distilled up to 140° C. at 20 mbar under a gentle nitrogen stream.

The product obtained was 440 g of a brown oil with the following $^1$H NMR data:

CDCl$_3$ solvent, δ 3.80 ppm (s, CH$_2$ thioglycol), 3.78 ppm (q, CH$_2$ ethoxy),
3.70 ppm (m, CH$_2$), 1.64 ppm (m, CH$_2$), 1.19 ppm (t, CH$_3$ ethoxy), 0.63 ppm (t, CH$_2$).

The mixtures were otherwise prepared by the process customary in the rubber industry under standard conditions in three stages in a laboratory mixer with a volume of 300 milliliters to 3 liters, in which, in the first mixing stage (base-mixing stage), all constituents apart from the vulcanization system (sulfur and vulcanization-influencing substances) were first mixed at 145 to 165° C., with target temperatures of 152 to 157° C., for 200 to 600 seconds. In the second stage, the mixture from the first mixing stage was mixed once again. Addition of the vulcanization system in the third stage (final mixing stage) afforded the final mixture, mixing being carried out at 90° C. to 120° C. for 180 to 300 seconds. All of the mixtures were used to prepare test specimens by vulcanization to t$_{95}$ (measured on a moving die rheometer to ASTM D 5289-12/ISO 6502) under pressure at 160° C., and these test specimens were used to determine material properties that are typical in the rubber industry by the test methods specified hereinafter.

Stress value at 300% elongation (300 modulus, M300) at room temperature (RT) or 70° C. to ISO 37

Resilience at RT or 70° C. to ISO 4662

Conditioned Shore A hardness at RT or 70° C. in accordance with DIN ISO 7619-1, preconditioned at 5 MPa ten times and then tested to ISO 868

Maximum loss factor tan δ (tangent delta) as the maximum value over the strain sweep from dynamic-mechanical testing at 55° C. to DIN 53513, (Tan d max 55° C.)

Loss factor tan δ (10%) from RPA (rubber process analyzer) in accordance with ASTM D6601 from the second strain sweep at 1 Hz and 70° C. (Tan d (10%) RPA)

Loss factor tan δ at 70° C. from the temperature sweep at constant force in accordance with DIN 53513. (Tan d (70° C.))

Substances Used
a) SSBR
b) VN 3 silica, from Evonik
c) Polar comparative silane (see WO 2015/172915 A1)

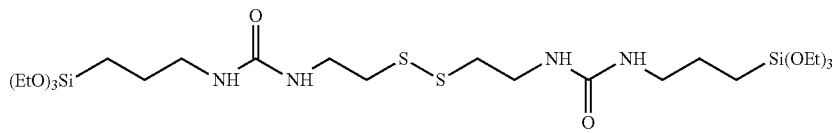

d) Urethane silane of formula II), for preparation see above
e) Amide silane of formula III), for preparation see above
f) DPG and CBS

TABLE 1

| Constituents | Units | V1 | V2 | E1 | E2 |
|---|---|---|---|---|---|
| NR TSR | phr | 20 | 20 | 20 | 20 |
| SSBR a) | phr | 80 | 80 | 80 | 80 |
| Silica b) | phr | 95 | 95 | 95 | 95 |
| Urea silane c) | phf | 9.8 | 11.3 | — | — |
| Urethane silane d) | phf | — | — | 9.8 | 11.3 |
| TDAE plasticizer | phr | 35 | 35 | 35 | 35 |
| Aging stabilizer | phr | 4 | 4 | 4 | 4 |
| Stearic acid | phr | 2.5 | 2.5 | 2.5 | 2.5 |
| ZnO | phr | 2.5 | 2.5 | 2.5 | 2.5 |
| Accelerator f) | phr | 3.6 | 3.6 | 3.6 | 3.6 |
| Sulfur | phr | 2 | 2 | 2 | 2 |
| Properties | | | | | |
| Cond. Shore hardness (RT) | Shore A | 66 | 66.2 | 65 | 66.2 |
| Cond. Shore hardness (70° C.) | Shore A | 61.8 | 61.8 | 61.4 | 62.4 |
| Resilience (RT) | % | 16.3 | 15.9 | 15.0 | 15.3 |
| Resilience (70° C.) | % | 38.5 | 39.0 | 41.8 | 42.4 |
| Difference in resilience | | 22.2 | 23.1 | 26.8 | 27.1 |
| 300 modulus (RT) | MPa | 9.8 | 9.9 | 9.8 | 10.6 |
| 300 modulus (70° C.) | MPa | 7.5 | 7.7 | 8.0 | 8.4 |
| Tan d max (55° C.) | MPa | 0.224 | 0.230 | 0.214 | 0.216 |

TABLE 2

| Constituents | Units | V3 | V4 | V5 | E3 | E4 | E5 |
|---|---|---|---|---|---|---|---|
| NR TSR | phr | 20 | 20 | 20 | 20 | 20 | 20 |
| SSBR a) | phr | 80 | 80 | 80 | 80 | 80 | 80 |
| Silica b) | phr | 95 | 95 | 95 | 95 | 95 | 95 |
| Urea silane c) | phf | 8.3 | 9.8 | 11.3 | — | — | — |
| Amide silane e) | phf | — | — | — | 7.6 | 8.9 | 10.2 |
| TDAE plasticizer | phr | 35 | 35 | 35 | 35 | 35 | 35 |
| Aging stabilizer | phr | 4 | 4 | 4 | 4 | 4 | 4 |
| Stearic acid | phr | 2.5 | 2.5 | 2.5 | 2.5 | 2.5 | 2.5 |
| ZnO | phr | 2.5 | 2.5 | 2.5 | 2.5 | 2.5 | 2.5 |
| Accelerator f) | phr | 3.6 | 3.6 | 3.6 | 3.6 | 3.6 | 3.6 |
| Sulfur | phr | 2 | 2 | 2 | 2 | 2 | 2 |
| Properties | | | | | | | |
| t90 | min | 10.1 | 10.2 | 9.1 | 6.3 | 8.8 | 7.6 |
| Resilience (RT) | % | 16.1 | 15.9 | 15.8 | 14.7 | 15.2 | 14.7 |
| 300 modulus | MPa | 9.2 | 9.6 | 9.9 | 8.9 | 9.8 | 10.1 |
| Tan d (10%) RPA | | 0.230 | 0.229 | 0.223 | 0.214 | 0.224 | 0.214 |
| Tan d (70° C.) | | 0.234 | 0.243 | 0.242 | 0.224 | 0.231 | 0.246 |

As can be inferred from table 1, an inventive silane of formula I) (example: silane of formula II)) resolves the trade-off between rolling resistance and wet grip to a particularly high degree, i.e. the rubber mixture has a particularly high level of properties. This is apparent in particular from the high differential between the resiliences (resilience at 70° C. minus resilience at RT).

The differential is distinctly higher than in the case of a rubber mixture containing a silane having a urea group in the spacer group.

At the same time, the rubber mixtures comprising a silane of formula II), compared to the respective comparative mixtures containing the same amount of silane, have comparable or even elevated stiffness, especially at elevated temperatures and temperatures that can occur in driving operation, as apparent from the M300 values and the conditioned Shore hardnesses at RT and 70° C.

As can be inferred from table 2, a silane of formula III) likewise resolves the trade-off between rolling resistance and wet grip to a high degree, i.e. the rubber mixture has a high level of properties, especially with very good rolling resistance indicators. At the same time, the rubber mixture comprising a silane of formula III) has comparable or even elevated stiffness and hence improved handling indicators; see M300 values. Moreover, a rubber mixture containing at least one silane of formula III) has a shortened full vulcanization time $t_{90}$, which results in a saving of energy, time and thus costs in the production of the rubber mixture or vulcanizates thereof.

A vehicle tire of the invention thus has a better level of properties with regard to rolling resistance, wet grip and handling characteristics, and can even be produced using less energy to some degree.

The invention claimed is:

1. A sulfur-crosslinkable rubber mixture comprising at least the following constituents:
    at least one diene rubber;
    at least one silica;
    at least one silane having the general empirical formula:

$$[(R^1)_oSi—(R^3—)_pX—(R^4—)_p]_mS_n(R^2)_{2-m}; \quad (I)$$

wherein o may be 1 or 2 or 3 and the $R^1$ radicals may be the same or different and are selected from $C_1$-$C_{10}$ alkoxy groups, $C_6$-$C_{20}$ phenoxy groups, $C_2$-$C_{10}$ cyclic dialkoxy groups, $C_2$-$C_{10}$ dialkoxy groups, $C_4$-$C_{10}$ cycloalkoxy groups, $C_6$-$C_{20}$ aryl groups, $C_1$-$C_{10}$ alkyl groups, $C_2$-$C_{20}$ alkenyl groups, $C_2$-$C_{20}$ alkynyl groups, $C_7$-$C_{20}$ aralkyl groups, halides or alkyl polyether group —O—($R^6$—O)$_r$—$R^7$, where the $R^6$ radicals are the same or different and are branched or unbranched, saturated or unsaturated, aliphatic, aromatic or mixed aliphatic/aromatic divalent $C_1$-$C_{30}$ hydrocarbon groups, r is an integer from 1 to 30 and the $R^7$ radicals are unsubstituted or substituted, branched or unbranched monovalent alkyl, alkenyl, aryl or aralkyl groups, or two $R^1$ correspond to a dialkoxy group having 2 to 10 carbon atoms, in which case o is <3, or two or more silanes of formula (I) may be bridged via $R^1$ radicals or by condensation; and with the condition that in formula (I), there is at least one $R^1$ selected from those abovementioned options in which the $R^1$ i) is bonded to the silicon atom via an oxygen atom or ii) is a halide in each $(R^1)_oSi$— group;

wherein the $R^3$ and $R^4$ radicals may independently be the same or different and are branched or unbranched, saturated or unsaturated, aliphatic, aromatic or mixed aliphatic/aromatic $C_1$-$C_{30}$ hydrocarbon groups, where the indices p may independently assume values of 0 or 1;

wherein X is a radical comprising at least one polar group selected from urethane, amide, ester, amine, thiourea, thioamide, O-organyl thiocarbamate, S-organyl thiocarbamate, amidine, guanidine, piperidine, maleic anhydride, sulfonamide, carbonate, imidazoline, thiazolidine, thiazolidinone, pyrrolidine, pyrazole, benzimidazole, indole, purine, thiazine, sulfonate, and phosphonate groups; and wherein m assumes the value of 1 or 2 and where n is an integer from 1 to 10 and where $R^2$ is a hydrogen atom or a —C(=O)—$R^8$ group, where $R^8$ is selected from hydrogen, $C_1$-$C_{20}$ alkyl groups, $C_6$-$C_{20}$ aryl groups, $C_2$-$C_{20}$ alkenyl groups and $C_7$-$C_{20}$ aralkyl groups.

2. The rubber mixture as claimed in claim 1, wherein X is a radical comprising at least one polar group selected from urethane, amide, ester, ether, amine, thiourea, thioamide, O-organyl thiocarbamate, S-organyl thiocarbamate, amidine, guanidine, piperidine, maleic anhydride, sulfonamide, carbonate groups.

3. The rubber mixture as claimed in claim 1, wherein X is a radical comprising at least one polar group selected from urethane and amide groups.

4. The rubber mixture as claimed in claim 1, wherein m is 2.

5. The rubber mixture as claimed in claim 1, wherein m is 1 and n is 1.

6. The rubber mixture as claimed in claim 1, wherein the at least one $R^1$ is a $C_1$-$C_{10}$ alkoxy group.

7. The rubber mixture as claimed in claim 1, wherein the silane of formula (I) has the following structure of formula (II):

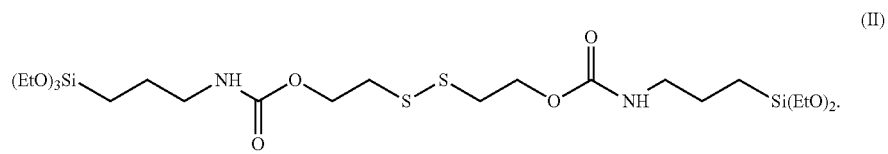

8. The rubber mixture as claimed in claim 1, wherein the silane of formula (I) has the following structure of formula (III):

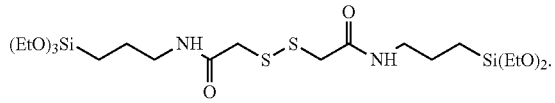

(III)

9. The rubber mixture as claimed in claim 1 further comprising from 5 to 500 phr of at least one silica.

10. The rubber mixture as claimed in claim 1, wherein the diene rubber is selected from the group consisting of natural polyisoprene (NR), synthetic polyisoprene (IR), butadiene rubber (BR), solution-polymerized styrene-butadiene rubber (SSBR) and emulsion-polymerized styrene-butadiene rubber (ESBR).

11. The rubber mixture as claimed in claim 1, wherein the $R^1$ radicals are selected from $C_1$-$C_{10}$ alkoxy groups provided $R^1$ is not a $C_2$-alkoxy group.

12. The rubber mixture as claimed in claim 1, wherein the $R^1$ radicals are selected from $C_3$-$C_{10}$ alkoxy groups.

13. The rubber mixture as claimed in claim 1, wherein the $R^1$ radicals are $C_1$ alkoxy groups.

14. The rubber mixture as claimed in claim 1, wherein o may be 1 or 2.

15. The rubber mixture as claimed in claim 1, wherein m assumes the value of 1.

16. The rubber mixture as claimed in claim 1, wherein m assumes the value of 2.

17. The rubber mixture as claimed in claim 1, wherein o may be 1 or 2, and wherein the $R^1$ radicals are selected from $C_1$-$C_{10}$ alkoxy groups, provided $R^1$ is not a $C_2$-alkoxy group.

18. A vulcanizate obtained by sulfur vulcanization of the at least one rubber mixture as claimed in claim 1.

19. A vehicle tire comprising at least one vulcanizate as claimed in claim 18 in at least one component.

20. The vehicle tire as claimed in claim 19 comprising the at least one vulcanizate in a tread.

* * * * *